United States Patent [19]

Lehureau

[11] Patent Number: 5,657,304
[45] Date of Patent: Aug. 12, 1997

[54] OPTICAL RECORDING MEDIUM WITH A DIFFRACTION GRATING LAYER

[75] Inventor: Jean-Claude Lehureau, Sainte Genevieve des Bois, France

[73] Assignee: Thomson-CSF, Paris, France

[21] Appl. No.: 510,656

[22] Filed: Aug. 3, 1995

[30] Foreign Application Priority Data

Aug. 30, 1994 [FR] France .................. 94 10412

[51] Int. Cl.$^6$ ................................................ G11B 7/26
[52] U.S. Cl. ................ 369/109; 369/112; 369/44.37; 369/94; 369/283; 369/284
[58] Field of Search ................ 369/44.26, 44.37, 369/44.38, 44.29, 169, 112, 94, 275.1, 280, 283, 286, 288

[56] References Cited

U.S. PATENT DOCUMENTS

| | | |
|---|---|---|
| 4,982,395 | 1/1991 | MacAnally . |
| 5,107,472 | 4/1992 | Fujiwara et al. ............... 369/44.26 |
| 5,128,914 | 7/1992 | Kurata et al. .................. 369/44.37 |
| 5,450,387 | 9/1995 | Ono et al. ...................... 369/44.37 |

FOREIGN PATENT DOCUMENTS

| | | |
|---|---|---|
| 0 073 066 | 3/1983 | European Pat. Off. . |
| 0 423 364 A1 | 4/1991 | European Pat. Off. . |
| 4-219654 | 8/1992 | Japan . |

*Primary Examiner*—Georgia Y. Epps
*Assistant Examiner*—Kim-Kwok Chu
*Attorney, Agent, or Firm*—Oblon, Spivak, McClelland, Maier & Neustadt, P.C.

[57] ABSTRACT

A system for the optical writing/reading of a recording medium, the system including at least one light source emitting three beams that focus at three distinct points on the recording medium and a diffraction device creating three orders of diffraction, −1, 0 and +1, for each beam, the focusing points of the three beams being aligned in the direction of diffraction of the diffraction device and being at a distance from one another so that, at the focusing point of the 0 order diffraction of the central beam, there is focused the −1 order diffraction of one lateral beam and the +1 order diffraction of the other lateral beam.

18 Claims, 4 Drawing Sheets

OPTICAL RECORDING MEDIUM WITH A DIFFRACTION GRATING LAYER

BACKGROUND OF THE INVENTION

The invention relates to a system of optical writing/reading on a recording medium and to its application to recording disks. It is applicable for example to optical recordings such as digital optical disks used in data processing, compact disks, etc.

Random access to a video sequence requires the storage, on a removable disk, of very large quantities of information elements. The MPEG1 high-definition digital video transmission standard based on non-compressed audio-digital channels enables interactivity. However there is already a need, as of now, for improved images defined according to the MPEG2 (XS) standard, or even images from portable equipment enabling only a DCT (Discrete Cosine Transform) compression in the 25 Mbits/s range. Furthermore, in order to provide for a single recording standard, the duration of the program must be extended to three hours without any gap.

Electronic reporting has introduced a need for quality video (50 to 150 Mbits/s) for a period of 20 minutes. In the next 10 years, high definition will introduce a requirement that is four times greater.

The maximum format that can be tolerated today is 5" in indoor equipment and 3.5" in portable equipment. The recording densities required are therefore:

15 bits/$\mu^2$ for 3 hours of MPEG2 recording on a 5" format;

20 bits/$\mu^2$ for 1 hour of large-scale consumer type DCT recording on a 3.5" format;

12 bits/$\mu^2$ for 20 minutes of ENG recording (75 Mbits/s) on a 5" format.

The description of the above products indicates a realistic path of development for optical recording technology:

multiplication by 25 of the performance characteristics of compact disks through the use of optical and electronic systems of greater efficiency;

in the next 10 years, further multiplication by four of the performance characteristics through the use of frequency-doubled laser.

The object of the invention is to achieve the recording/reading of 0.3 $\mu$ tracks at a density of 125 Kbpi by using a conventional laser.

The making of a spot capable of a resolution of 0.2 $\mu$ as understood by Shannon's theorem (2.5 cycles/$\mu$ at 50% of modulation) assumes the use of a digital aperture NA=2 for a laser with a wavelength 0.8 $\mu$. However, the use of a more compact code (RLL=Run Length Limited or PRML=Partial Response Maximum Lightly codes), an equalization enabling the operating point to be pushed back −6 dB closer to the cut-off frequency and a red laser (0.65 $\mu$) suggests that an aperture of about 1.2 is sufficient.

Conventionally, such an aperture may be obtained by the use of an immersion optical system. The index of the liquids may reach 2 in certain iodized (but toxic) compounds and is easily equal to 1.7 in non-toxic compounds. Although it is unrealistic, the use of such a system is not less feasible than the use of a microscope in a near field. It has also been proposed to carry out a dry immersion microscopy, i.e. by bringing the information medium close enough to the lens so that the evanescent wave coming from the lens is picked up by a layer with a high index covering the medium. It must be noted that magneto-optical disks are already covered with such a layer for the chemical protection and improvement of the contrast. The layers used at present give an index in the region of 2. It would not be unrealistic to use transparent layers in the red part of the spectrum having an index in the region of 4. The boundary potential of resolution of a red beam in such an environment is therefore about 0.05 $\mu$m.

The invention relates to a system that can be used to keep a major barrier space between the objective and the medium, enabling the system to work even in the presence of dust.

SUMMARY OF THE INVENTION

The invention therefore relates to a system for the optical writing/reading of a recording medium, wherein said system comprises:

at least one light source emitting three beams that focus at three distinct points on the recording medium;

a diffraction device creating three orders of diffraction for each beam;

the focusing points of the three beams being aligned in the direction of diffraction of the diffraction device and being at a distance from one another so that, at the focusing point of the 0 order diffraction of the central beam, there are focused the −1 order diffraction of one lateral beam and the +1 order diffraction of the other lateral beam.

The possibility of making beams with a high digital aperture in a layer with a high index can easily be understood by the use of microlenses. In order to make the entire unit in a thin layer, these microlenses may take the form of Fresnel zones.

It has been observed however that during the shifting of the medium, only one fixed spot is generated on the photosensitive layer. One spot corresponds to each lens. It is of course possible to carry out multiple recordings by varying the incidence of the beam, but this is limited either by the difficulty of tilting a wide-aperture beam or by the impossibility of highly tilting the beam within the material if wider-diameter microlenses diameters are used.

A more mathematical way of expressing this limitation is to say that, if there is a one-to-one correspondence between the monomode beams defined in the air and those defined in the medium, then the limitation existing in the air applies in the environment having the index. The only way to truly increase the capacity of the disk therefore is to superimpose the lenses so as to reduce the field needed to cover the entire surface. This is done at the cost of a loss of efficiency since all the light is not focused at the same point. However, this loss is easily compensated for by the increase in sensitivity related to the reduction of the surface area taken up by a bit.

According to the invention, to superimpose these beam focusing points, there is provided a diffraction grating whose direction of diffraction is parallel to the direction of flow of the information elements of the recording medium (disk). The lines of the grating are therefore perpendicular to this direction of flow.

Furthermore, according to the invention, this grating is illuminated by three beams focused towards the recording medium.

BRIEF DESCRIPTION OF THE DRAWINGS

The different objects and characteristics of the invention shall appear more clearly from the following description and from the appended figures, of which.

MORE DETAILED DESCRIPTION

Figure 1:
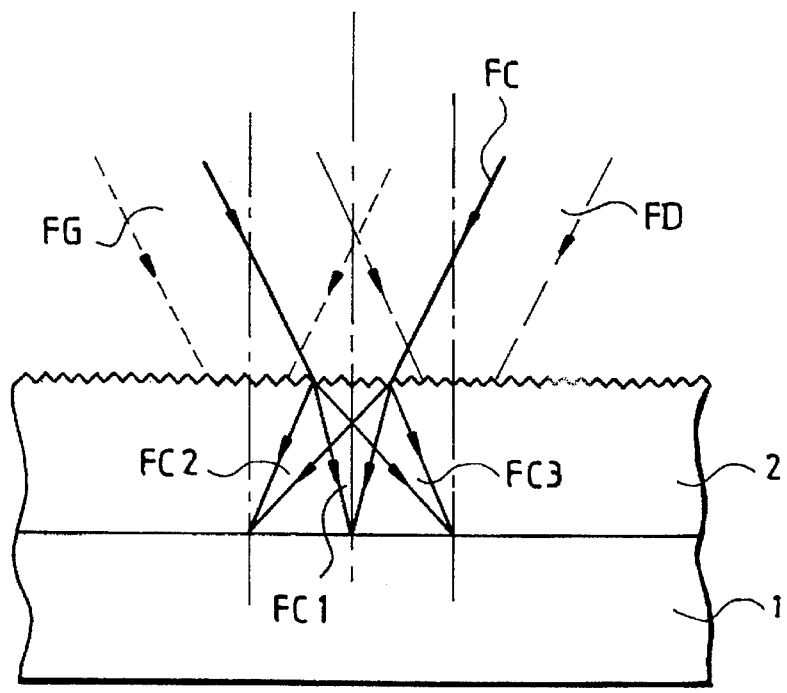
FIGS. 1 and 2 exemplify an embodiment of the system of the invention.
Figure 2:
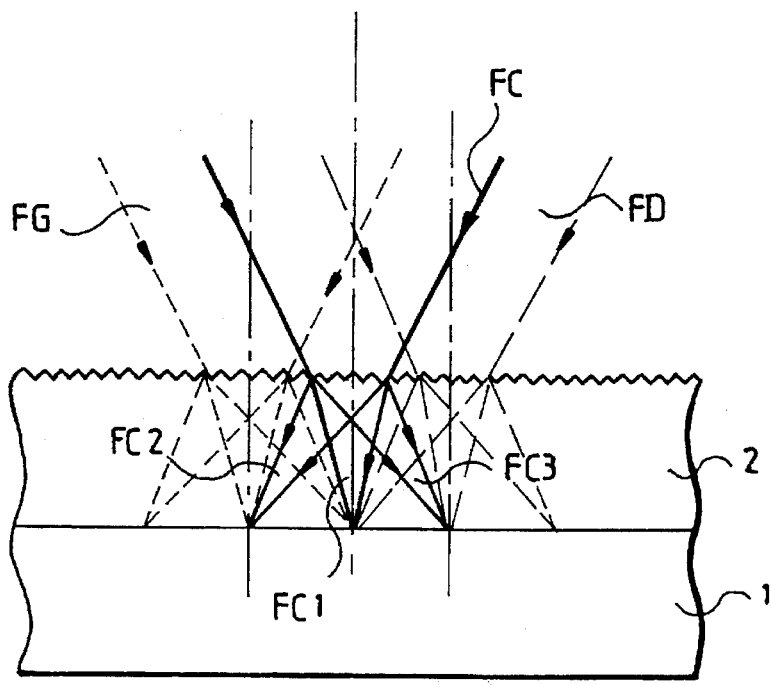

FIGS. 1 and 2 exemplify an embodiment of such a system.

With a recording medium 1, there is associated a diffraction grating 2. The diffraction grating is illuminated by three beams FG, FC and FD.

The three beams FG, FC and FD have parallel optical axes and are all three designed to be focused in a plane parallel to that of the recording medium 1 when there is no diffraction grating.

The presence of the diffraction grating is designed to focus these beams on the surface of the recording medium 1.

Each beam is diffracted by the diffraction grating so that each gives rise to three beams. FIG. 1 shows only the diffraction of the beam FC. This diffraction gives rise to three beams FC1, FC2, FC3. The beam FC gives rise to a central beam FC1 that is subjected to 0 order diffraction in the grating and is focused on the optical axis. There are also two side beams FC2 and FC3 diffracted by +1 order and −1 order diffraction from the grating.

The beams FG and FD are also diffracted in the same way. For reasons of clarity, the diffraction of the beams FG and FD are not shown in FIG. 1. However, it is shown in FIG. 2.

According to the invention, it is also provided that the relative positions of the beams will be such that the side beam FG3 gets focused at the same place as the side beam FC1. This is also the case for the side beam FD2.

By adjusting the relative phases of the minor lobes and major lobes corresponding to the side and central beams of each diffracted beam, the interferences of these two beams are rendered constructive at the central focusing point PFC and destructive at the side focusing points.

When the recording medium is being translated before the three beams FC, FG, FD, the phase of the central beam (0 order diffraction) is not affected. However, the contribution of the minor lobes (+1 order and −1 order diffraction) is subjected to a Doppler effect. When there is a phase shift, the interference is no longer constructive at the center of the beam. The maximum intensity seems to shift with the substrate and decreases in moving away while a new spot appears at a distance equal to a step of the grating. In fact, the spot appears to play at "leap-frog" on the disk with the period of the grating.

This phenomenon makes it possible of course to superimpose several recordings by modifying the phase of the side lobes. For this purpose, the three beams FG, FC, FD are obtained by interposing another phase grating on the path of a source laser beam. Several recordings may be superimposed by the slight modification, for each recording, of the position of the grating with respect to the axis of the source laser beam. This modifies the relative phase of the diffracted orders.

However, the spaced-out reading of adjacent zones of the disk does not enable any electronic correction of cross-talk between symbols. There is therefore provided a system in which the entire disk is explored in a single pass.

For this purpose, there is provision to compensate for the Doppler effect related to the flow of the grating by a continuous phase shift of the side lobes.

It is observed that the spot may be refined by a factor of 2.5 at mid-height with respect to the major lobe. The stability of this spot in the middle of the lobe is ensured for all the phases of the grating. This therefore ensures the high quality of the spot.

There is therefore obtained, at the focusing point PFC, a light spot whose energy intensity has considerably increased.

Figure 3:
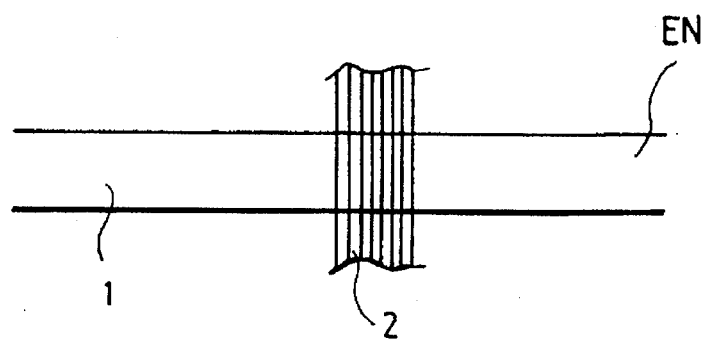
FIG. 3 exemplifies an application of the invention to a linear recording medium.

FIG. 3 shows a top view of a general arrangement of the diffraction grating 2 with respect to the recording medium. For example, this recording medium is a recording track 1. The information elements are distributed along the direction of this track. The diffraction grating 2 must diffract the beams shown in FIGS. 1 and 2 along this direction. The diffraction grating symbolized by lines in FIG. 3 therefore has lines perpendicular to the direction of recording.

Figure 4:
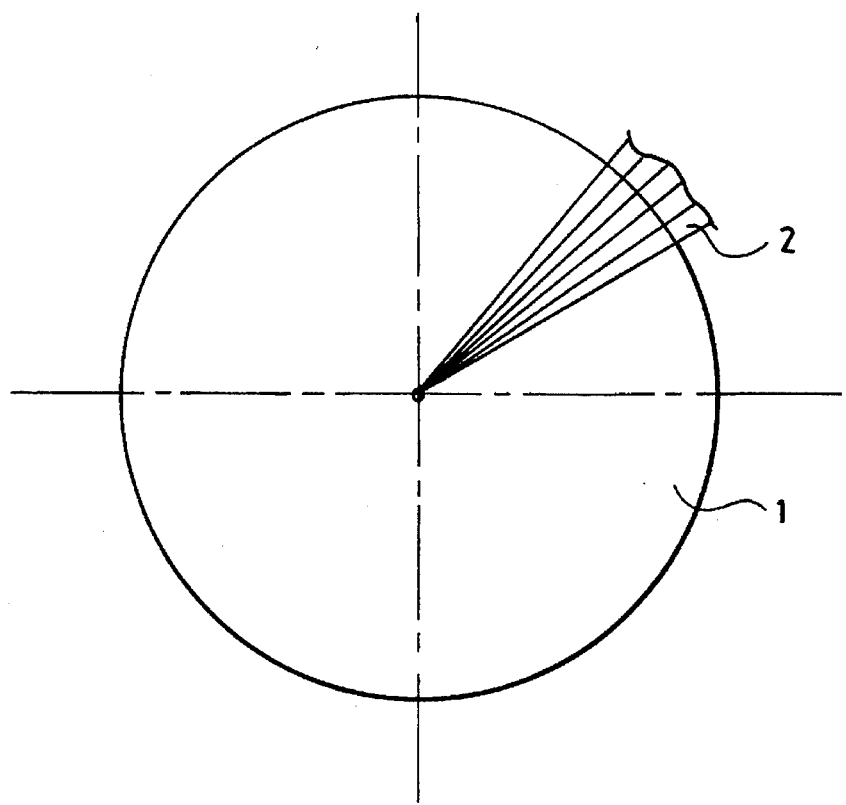
FIG. 4 exemplifies an application of the invention to a circular recording medium.

FIG. 4 shows an application of the invention to a recording disk 1 on which the information elements are recorded on concentric tracks. The diffraction grating 2 is then arranged radially with respect to these tracks.

According to a first embodiment, the diffraction grating 2 is done on the surface of the recording medium 1 and therefore forms an integral part of the disk.

According to another embodiment, the diffraction grating is a separate device 2 that shifts in synchronism with the recording medium. In the case of a recording disk, the diffraction grating is made radially on a disk that rotates at the same time as the recording disk.

Figures 5A, 5B:
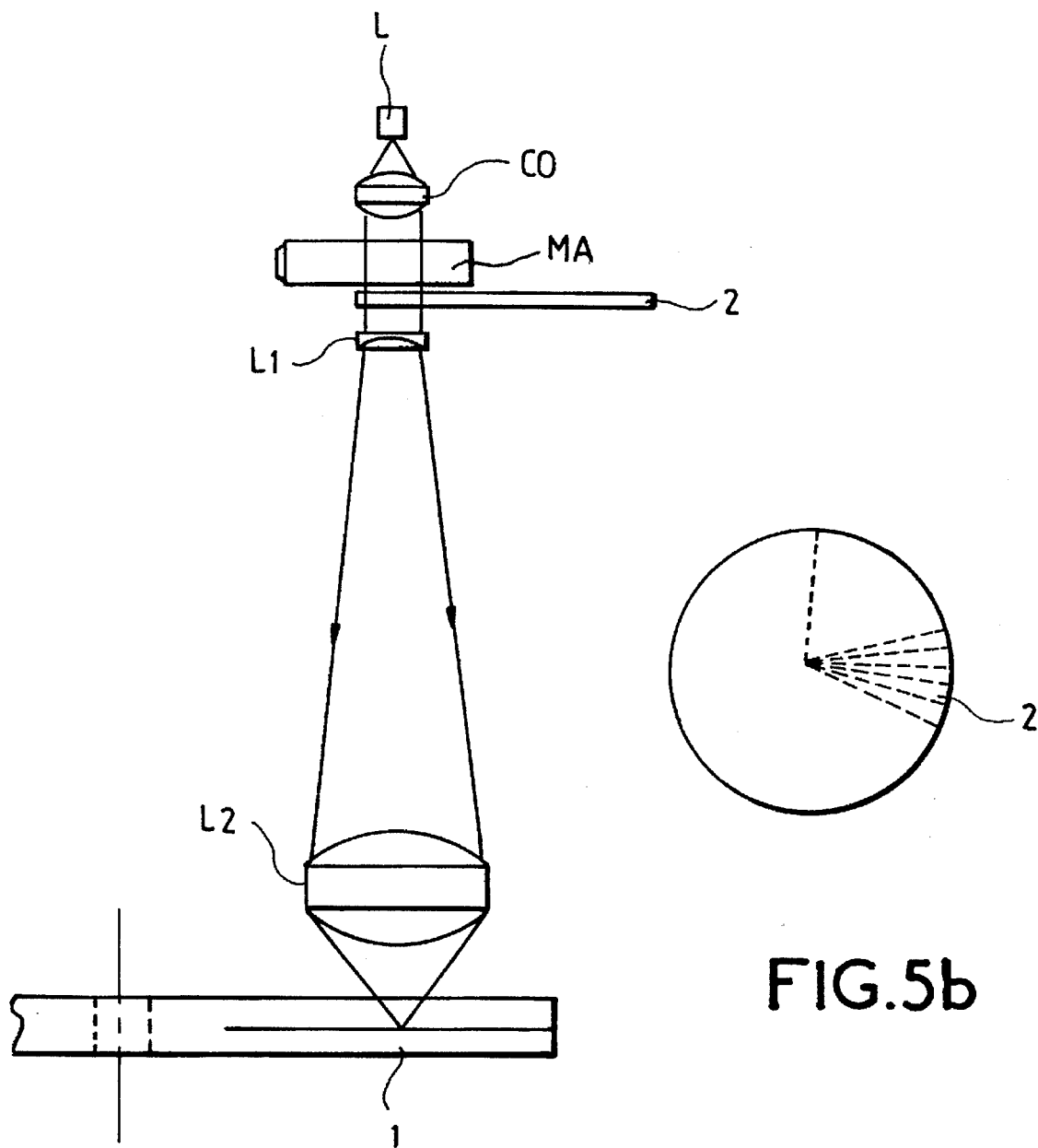
FIGS. 5a, 5b show a detailed arrangement of the system of the invention.

FIG. 5a exemplifies an embodiment of a writing and/or reading device for an optical disk.

For the applications proposed here above, the linear speed of the disk varies from 2 to 15 m/s. A simple way of making the three phase-modulated beams FG, FC, FD is to use a phase grating or an acousto-optical modulator MA. The speed of sound in this low-performance modulator will be about 1000 m/s. It is therefore necessary to provide for a magnification of 60 to 500 between the focused spot (0.6 µ) and the size of the beam crossing the modulator (acousto-optical box). This will be ensured by the interposing of a collimator CO with an appropriate focal length between the semiconductor laser and the modulator. It may be chosen to make this part in integrated optics technology and use a Rayleigh wave modulator. The acoustic frequency will be substantially equal to half of the bit frequency, namely 5 to 40 MHz. It can be seen that the performance characteristics required of the modulator are very limited. As mentioned, the phase grating may be designed to carry out several recordings multiplexed on one and the same track. Between each recording, the phase grating is shifted in parallel to the recording track.

In FIG. 5a, the beams transmitted by the modulator MA go through the grating 2. This is shown in a top view in FIG. 5b and takes the form of a disk. The beams coming from the grating 2 are then focused on the disk 1 by optical systems L1 and L2.

According to one variant (not shown), it is possible to derive a form of embodiment from that of FIG. 5 in not providing for the grating 2 as a separate element but by making it on the surface of the disk 1 as indicated here above.

The system of the invention can also be applied to the following-up of the track of the recording medium. For reasons of easier explanation, the description is continued in assuming that the recording medium is a disk. The following-up of the track consists then in a radial following operation so as to hold the light spot on a path that is circular with respect to the center of the disk.

According to the invention, provision is therefore made, on either side of the beam FC emitted by the source (or by the modulator MA), for two beams FG' and FD' similar to the beams FG and FD. However, the beams FG', FC, FD' are aligned in a direction preferably perpendicular to the recording direction. They are therefore in a plane that contains a radius of the disk so that their spot on the disk is aligned according to a radius of the disk.

There is furthermore provision for a diffraction grating that diffracts these beams radially with respect to the disk. This grating is therefore oriented in the direction of shift of the information medium. In the case of a disk, the diffraction grating is placed tangentially to the tracks of the tangential disk. Since the radial shift is slow and bidirectional, it is preferable to make these lobes by means of an etched grating that will be shifted mechanically. In order to provide for continuous follow-up of the track, it may be preferable to effect the rotation of a small disk bearing a radial grating whose index lines (streaks for example) are radial on this disk and tangential to the tracks of the recording disk.

The working of this pick-up assumes, in addition to the usual radial and vertical servo-links, the continuation of the phases of the radial and tangential gratings. Error signals may undoubtedly be deduced from the light reflected on the side lobes.

According to one embodiment, the two gratings described here above, namely the one perpendicular to the direction of shift of the recording medium and the one parallel to this direction are therefore perpendicular to each other and may be made on one and the same medium. For example, they may be made on the surface of the disk.

Figure 6A:
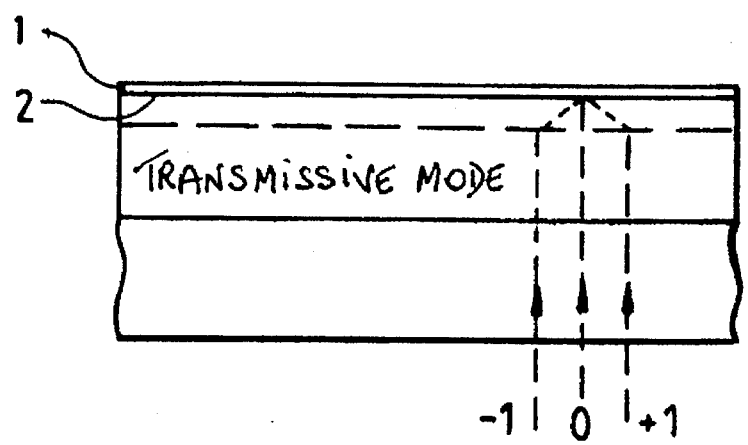
FIGS. 6a, 6b exemplify recording media according to the invention.
Figure 6B:
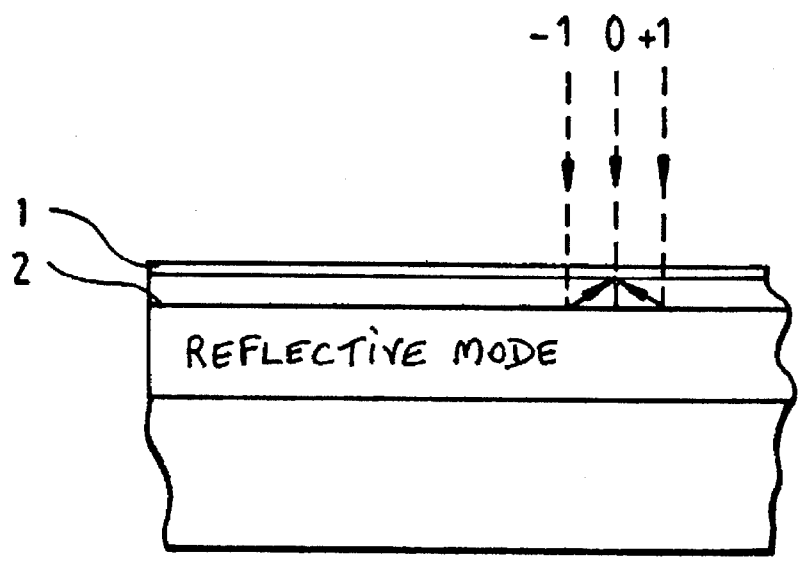

The grating or gratings thus described may be made in transmissive mode or in reflective mode. FIG. 6a shows a diffraction grating 2 made in transmissive mode on a disk and FIG. 6b shows a diffraction grating made in reflective mode.

The effect of the refinement of the spot is the optimum for phase shifts of about one radian introduced by the grating, i.e. 0.1 μ:

it is possible to make such phase shifts by the recording of a grating in a photorefractive medium. Since the index divergence is only 0.1 to 0.2, the thickness of insolated resin should be about one micron;

it is possible to make the grating by mechanical copying in a thermosetting resin. However, the thickness of this resin after molding should be done with care. Furthermore, the index of this resin can only be about 1.5. The depth of the relief will therefore be about 0.15 μ;

the grating can finally be done mechanically during the injection of the substrate either in transmission (the grating is then covered with a material having a high index and then with the recording layer) or by reflection (the grating is covered with a reflective layer and then a layer with a index and the recording layer.

What is claimed is:

1. A system for the optical writing/reading of a recording medium, said system comprising:

at least one light source emitting three beams including a central beam and two lateral beams that focus at three distinct points on the recording medium;

a diffraction device creating three orders of diffraction, −1, 0 and +1, for each beam;

the focusing points of the three beams being aligned in the direction of diffraction of the diffraction device and being at a distance from one another so that, at the focusing point of the 0 order diffraction of the central beam, there is focused the −1 order diffraction of one of said two lateral beams and the +1 order diffraction of another one of said two lateral beams.

2. A system according to claim 1, wherein the diffraction device is a diffraction grating.

3. A system according to claim 1, wherein the light source comprises a diffraction grating creating said three beams out of a single beam.

4. A system according to claim 3, wherein the diffraction grating may be shifted in parallel to the direction of a track to make several recordings on one and the same track.

5. A system according to claim 1, wherein the direction of diffraction of the device is perpendicular to the direction in which the recording medium is shifted.

6. A system according to claim 5, wherein the recording medium is circular and wherein the recording tracks are also circular.

7. A system according to claim 5, wherein the diffraction device is integrated into the recording medium.

8. A system according to claim 5, wherein the diffraction device moves at the same speed as a reading beam or beams with respect to the recording medium.

9. A system according to claim 8, wherein the recording medium is a disk and wherein it comprises a diffraction disk having a diffraction grating having index lines which are radial on said disk and tangential with respect to the tracks of the recording medium.

10. A system according to claim 1, wherein the direction of diffraction of the device is parallel to the direction in which the recording medium is shifted.

11. A system according to claim 10, wherein the diffraction device moves at the same speed as the recording medium.

12. A system according to claim 10, wherein the diffraction device is linear and wherein there are index lines perpendicular to the direction in which the recording medium is shifted.

13. A system according to claim 12, wherein the recording medium is circular and wherein there are recording tracks which are also circular, the lines then being radial.

14. A recording disk comprising at least one diffraction grating covering the useful recording surface of the disk, said diffraction grating creating three orders of diffraction, −1, 0 and +1 for a reading beam.

15. A recording disk applying the system according to claim 14 wherein said diffraction grating has index lines which are radial to the center of the disk.

16. A recording disk system according to claim 14, wherein said diffraction grating has index lines which are concentric to the center of the disk.

17. A recording disk according to claim 14, with optical or magneto-optical reading and/or recording.

18. A recording disk according to claim 14, operating by reflection or by transmission.

* * * * *